United States Patent [19]

Franks

[11] 4,424,631
[45] Jan. 10, 1984

[54] ELECTRICAL COMPASS

[75] Inventor: Jeffrey L. Franks, Holland, Mich.

[73] Assignee: Prince Corporation, Holland, Mich.

[21] Appl. No.: 353,896

[22] Filed: Mar. 2, 1982

[51] Int. Cl.³ .................... G01R 33/02; G01C 17/30
[52] U.S. Cl. .................................. 33/361; 33/363 Q
[58] Field of Search ............... 33/361, 363 Q, 355 R, 33/356; 324/253, 254, 251

[56] References Cited

U.S. PATENT DOCUMENTS

| | | | |
|---|---|---|---|
| 2,053,154 | 9/1936 | LaPierre | 33/361 |
| 2,308,566 | 1/1943 | Noxon | 33/361 |
| 2,475,593 | 7/1949 | Craddock et al. | 33/361 |
| 2,852,859 | 9/1958 | Depp | 33/361 |
| 3,678,593 | 7/1972 | Baker et al. | 33/361 |
| 3,778,703 | 12/1973 | Jackson | 33/361 |
| 3,903,610 | 9/1975 | Heaviside et al. | 33/361 |
| 3,905,121 | 9/1975 | Takeda et al. | 33/361 |
| 3,971,981 | 7/1976 | Nakagome et al. | 33/361 |
| 4,030,204 | 6/1977 | Edwards | 33/361 |
| 4,157,619 | 6/1979 | Zuvela | 33/352 |
| 4,179,741 | 12/1979 | Rossani | 33/356 |
| 4,250,626 | 2/1981 | Lazar | 33/363 R |
| 4,277,751 | 7/1981 | Lawson et al. | 33/361 |

FOREIGN PATENT DOCUMENTS

| | | |
|---|---|---|
| 2929504 | 1/1980 | Fed. Rep. of Germany . |
| 54-28165 | 3/1979 | Japan . |

*Primary Examiner*—Willis Little
*Attorney, Agent, or Firm*—Price, Heneveld, Huizenga & Cooper

[57] ABSTRACT

A magnetic field detecting system for use with a flux-gate sensor includes an oscillator, the output of which is applied to a digital bandpass filter and frequency divided and also applied to the sensor, and phase detectors such that the frequency and phase of the output signals from the flux-gate sensor have a predetermined relationship to the excitation signal. In one embodiment of the invention, the direction indicating output signals from the phase detectors are applied to a suitable interface circuit for a microprocessor which converts the signals to a digital format employed for application, to an alpha-type display for displaying the octal magnetic orientation of a vehicle.

16 Claims, 3 Drawing Figures

ELECTRICAL COMPASS

BACKGROUND OF THE INVENTION

P The present invention relates to compasses and, particularly, to an electrical circuit for processing signals from a flux-gate magnetic sensor used in a compass.

Compasses for vehicles such as automobiles, typically, are after-market items of a relatively basic mechanical design. Such compasses, typically, attach to the dashboard of the vehicle and are of inexpensive construction including a compass card suspended by a pin bearing and mounted within a housing. Usually, they will include some elemental form of adjustment or compensation mechanism such as movable magnets for adjusting the compass to north and south, depending on the geographical area of use of the vehicle.

The theory of operation of flux-gate magnetic sensors is well known and one application to the automotive environment is described in an article entitled "Magnetic Field Sensor and its Application to Automobiles" by Hisatsugu Itoh published on Feb. 25-29, 1980 by the Society of Automotive Engineers, Inc. as SAE Technical Paper No. 800123. In the commercial embodiment of this system, the bandpass filters incorporated to detect the second harmonic of the excitation input frequencies for the sensor must be critically tuned such that the quadrature information can be accurately detected and subsequently employed to drive a display of the vehicle heading. Not only must the system, however, be critically tuned, the stability of the bandpass filter and its power supply must be designed to be substantially drift free in order to provide accurate information to the phase detectors such that accurate direction display results.

SUMMARY OF THE PRESENT INVENTION

In order to overcome the deficiencies of the prior art flux-gate sensor application in the automotive environment, and to provide a more accurate and yet, more readily assembled and less expensive system, the system of the present invention incorporates a digitally controlled bandpass filter and synchronous phase detector both of which are frequency and phase locked to an oscillator also employed to excite the flux-gate sensor such that tuning free assembly and operation of the system results. Magnetic field detecting systems embodying the present invention for use with a flux-gate sensor include an oscillator, the output of which is applied to a digital bandpass filter and frequency divided and also applied to the sensor, and phase detectors such that the frequency and phase of the excitation signal bear a direct and predetermined relationship to the signal output signals from the flux-gate sensor.

In one embodiment of the invention, the direction indicating output signals are applied to a suitable interface circuit for a microprocessor. The microprocessor converts the signals to a digital format employed for application, to an alpha-type display for displaying, for example, the octal magnetic orientation of a vehicle.

These and other features, objects and advantages of the present invention can best be understood by reference to the following description thereof together with the accompanying drawings in which:

DETAILED DESCRIPTION OF THE PREFERRED EMBODIMENT

Figure 1:
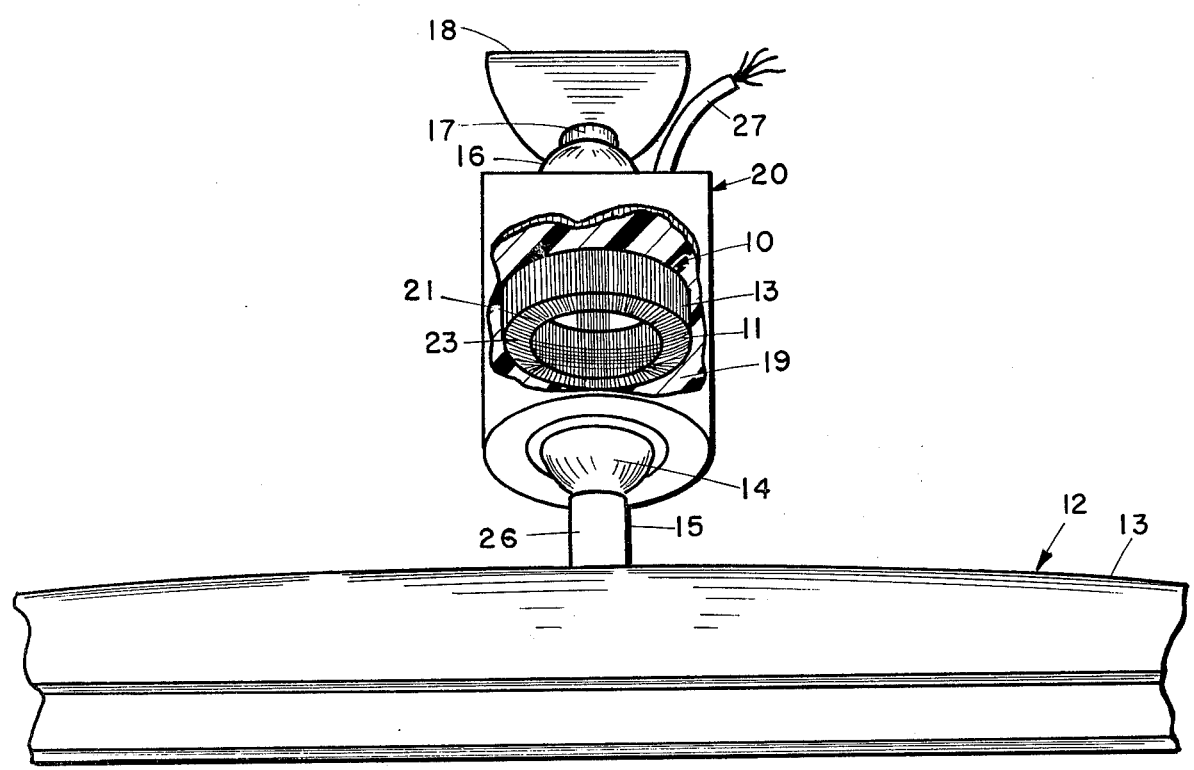
FIG. 1 is a fragmentary, top plan view of a rearview mirror for a vehicle shown partly broken away and incorporating a flux-gate type magnetic sensor.
Figure 2:
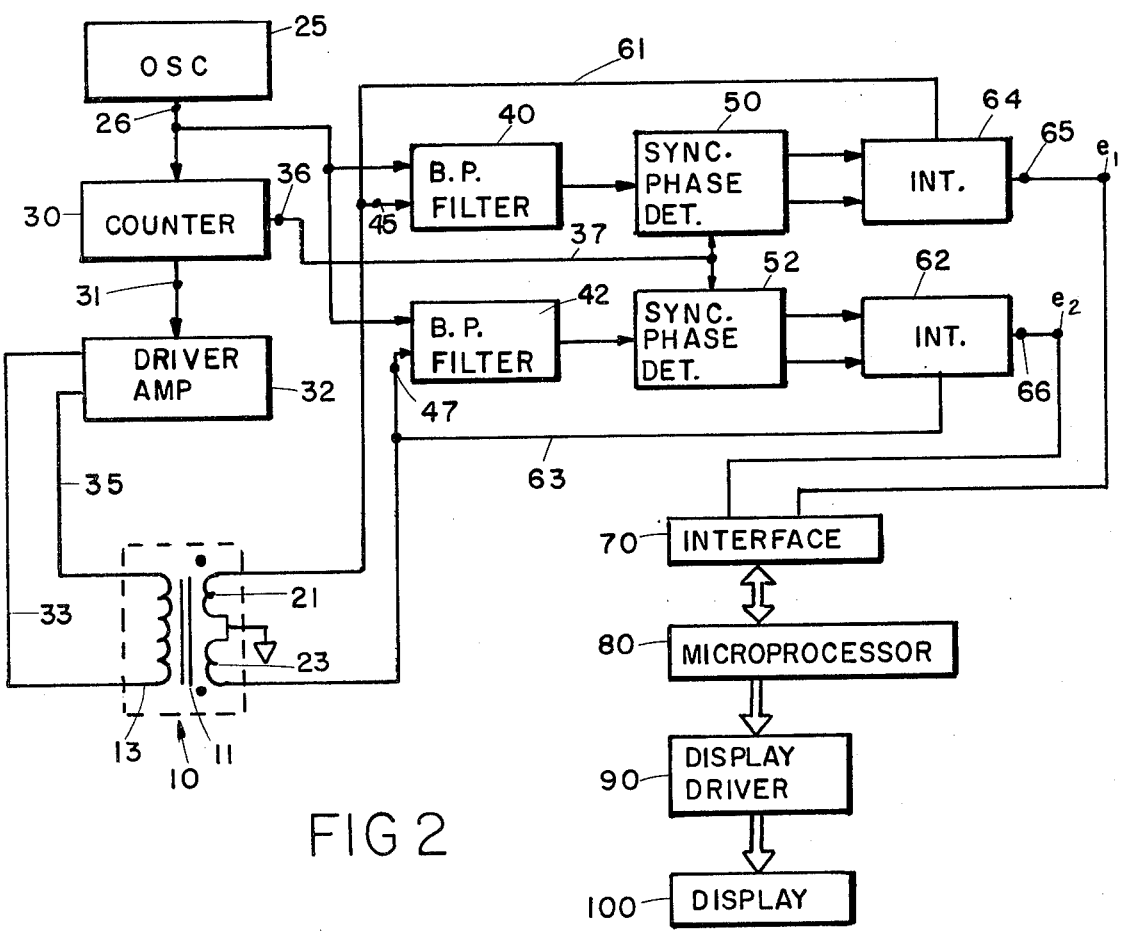
FIG. 2 is an electrical circuit diagram partly in block and schematic form showing a system embodying the present invention.

Referring initially to FIGS. 1 and 2, a flux-gate type magnetic sensor 10 is mounted within the cylindrical barrel 20 forming a portion of the mounting assembly for a rearview mirror 12 of a vehicle. The rearview mirror 12 including its housing 13 can be of conventional construction and is coupled to the cylindrical barrel 20 by means of a front ball joint 14 coupled to housing 13 by means of a stem 15. Barrel 20 includes a conventional socket for captively and pivotally holding ball 14 therein. Similarly, a rear ball joint 16 including a stem 17 couples the opposite end of cylinder 20 to a mounting bracket 18, typically secured to the windshield of a vehicle by means of a corresponding mating bracket adhered to the windshield or by connection to the vehicle headliner, in some instances. Barrel 20 also includes a socket for captively and pivotally receiving ball 16 such that mirror 12 can be adjusted for rear vision by the vehicle operator.

Barrel 20 can be of conventional construction in terms of the sockets for receiving fore and aft balls 14 and 16, respectively, however, the diameter of the midsection of the barrel 20 is slightly enlarged to receive the flux-gate sensor 10. Sensor 10 includes a toroidal core 11 having a generally rectangular cross-section, an excitation winding 13 helically wound around core 11 and orthogonally aligned first and second sensing windings 21 and 23, respectively, poled as shown by the dots in FIG. 2 and wound in orthogonal relationship to one another about the toroid as shown in FIG. 1 to provide orthogonally phased output signals of varying magnitude depending upon the sensed external or earth's magnetic field. Sensor 10 is secured within the non-ferro-magnetic barrel by a suitable bonding or potting material 19 to be horizontal when the mirror is in a normal adjusted position. Also, the North-South winding 21 is aligned to be parallel to the longitudinal axis of the vehicle. Electrical leads from the windings 13, 21 and 23 are extended from barrel 20 by a suitable cable 27 extending between the sensor 10 and the associated electrical circuits shown in FIGS. 2 and 3.

As shown in FIG. 2, the compass system includes an oscillator 25 which in the preferred embodiment is an R-C oscillator having an output frequency of approximately 80 kHz at output terminal 26 thereof. The output signal from oscillator 25 is applied to a counter circuit 30 providing 400 Hz at output terminal 31 which is applied to a driver amplifier 32 which subsequently applies the 400 Hz signals to excitation winding 13 of sensor 10 by means of conductors 33 and 35. Counter 30 also provides an 800 Hz signal at output terminal 36 which is applied to synchronous phase detector circuits 50 and 52. The output terminal 26 of oscillator 25 is also coupled to clock input terminals of digital bandpass filters 40 and 42. Filters 40 and 42 also include signal input terminals 45 and 47, respectively coupled to one end of sensing coils 21 and 23, as shown in FIG. 2, with the remaining terminals of coils 21 and 23 commonly coupled to system ground as shown in FIG. 2. The output of bandpass filters 40 and 42 are coupled to the input terminals of synchronous phase detectors 50 and 52 such that selected harmonic frequency signals, as described in greater detail below, are applied to each of the synchronous phase detectors which are actuated by an enabling signal from counter 30 via an enabling line 37 to apply positive and negative half-cycle sinusoidal signals received from sensing coils 21 and 23 through bandpass filters 40 and 42 to integrating and inverting amplifier circuits 62 and 64. The closed loop gain of the system is controlled through a feedback path including conductors 61 and 63 extending between integrating amplifier 64 and flux-gate sense winding 21 and integrator 62 and flux-gate sense winding 23, respectively. At the output terminals 65 and 66 of integrators 64 and 62, respectively, there is thus provided DC varying signals $e_1$ and $e_2$, respectively, which respresent the direction information from sensing coils 21 and 23. The amplitude and polarity of $e_1$ and $e_2$ varies with vehicle direction with respect to the earth's magnetic field. These DC varying signals are applied to a suitable interface circuit 70, including for example, suitable amplifiers and an AD converter for converting the DC signal information to digital signals. The microprocessor 80 includes associated RAM and ROM memories with the ROM programmed to mathematically derive an output control signal in the form of the arc tangent of the ratio $e_1/e_2$ to provide a digital output control signal applied to a display driver circuit 90 for alpha display 100 such that octant direction information can be displayed to the vehicle operator. The processing of signals $e_1$ and $e_2$ from integrator circuits 62 and 64 by a conventional microprocessor and program to provide the $\tan^{-1} e_1/e_2$ in a digital format for octant display of vehicle direction is entirely conventional. Having described the overall system, a detailed description of the preferred electrical circuit for providing the direction signal information from the flux-gate sensor is now presented in conjunction with FIG. 3.

Figure 3:
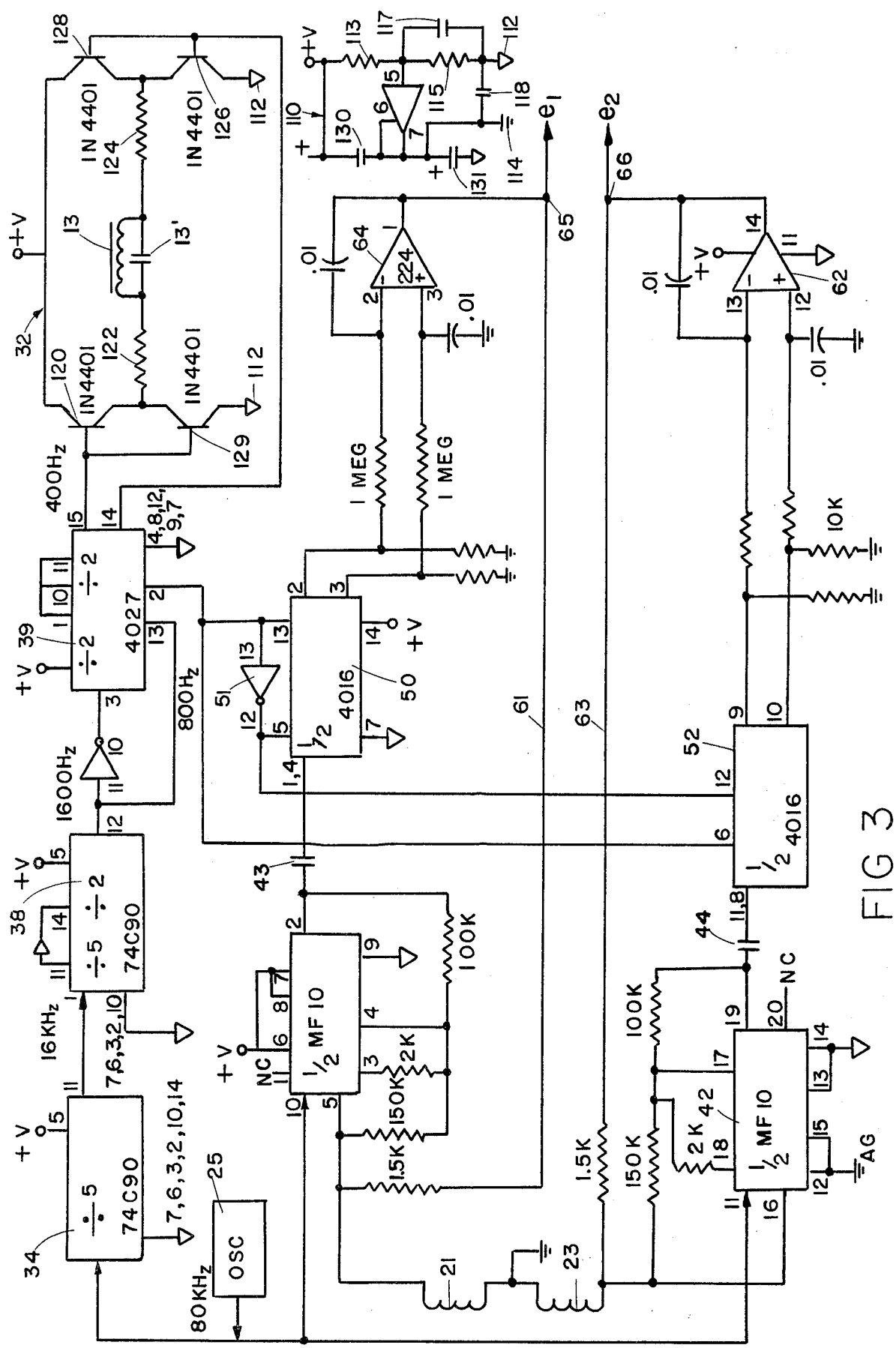
FIG. 3 is an electrical circuit diagram in schematic form showing details of a portion of the circuit shown in FIG. 2.

Referring to FIG. 3, oscillator 25 provides an essentially square wave output frequency of 80 kHz applied to the input of counter circuit 30 comprising, in the preferred embodiment, series coupled counters 32, 34 and 38 each of which are commercially available integrated circuit chips having model numbers indicated thereon and each of which are coupled to the +V power supply for receiving operating power as well as to a system ground indicated by the triangular symbol. A floating ground, indicated by a conventional ground symbol, is also provided inasmuch as the system is adapted for vehicle use and only a positive battery supply is typically available. Accordingly, a power supply 110 provides both a system ground 112 and a floating ground 114 which is coupled to the junction of resistors 113 and 115 by an operational amplifier 116 for impedance isolation. Filter capacitor 117 by-passes resistor 115 while a similar capacitor 118 AC couples grounds 112 and 114. Capacitors 130 and 131 are coupled as shown to stabilize analog ground.

Counter circuit 34 divides the 80 kHz signals from oscillator 25 to 16 kHz signals applied to the input of counter 38 which divides the signals by ten to provide 1600 Hz signals which are subsequently applied to input terminals 13 and 3 of counter 39 with the later signal being applied through an inverter circuit 41. Counter 39 develops an 800 Hz generally square wave output signal at pin 2 thereof and 400 Hz output signals of opposite polarity at pins 15 and 14 which are applied to the driver amplifier circuit 32 for driving excitation coil 13 associated with the flux-gate sensor 10 such that the flux-gate core is driven into saturation. Capacitor 13' is in parallel with coil 13 to suppress radio frequency interference.

Driver amplifier 32 is a push-pull type amplifier having one current path consisting of the collector-to-emitter current path of a first NPN transistor 120 (driven by a positive going signal from terminal 15 of counter 39) through resistor 122, through excitation coil 13, a second resistor 124, and a PNP transistor 126 biased in a conductive mode by an opposite polarity signal from output terminal 14 of counter 39. During alternate half cycle of operation, the current path is reversed and is provided by the collector-to-emitter current path of NPN transistor 128 through resistor 124, coil 13, resistor 122 and the emitter-to-collector current path of transistor 129 to system ground 112. Thus, coil 13 is excited at a fundamental frequency of 400 Hz and core 11 is driven into saturation by the current through power transistors 120, 126 and 128 and 129, respectively at this fundamental frequency.

As is known, the flux-gate sensor 10 operates by the earth's or other external magnetic field off-setting the hysteresis curve for second harmonic frequency signals depending on the orientation of the flux-gate sensor with respect to the earth's magnetic field. Thus, it is desired to detect and measure the polarity and magnitude of the second harmonic (i.e. 800 Hz) signals from detection coils 21 and 23 which are orthogonally related. In order to synchronize the detection of the second harmonic frequency signals by phase detectors 50 and 52, the 800 Hz signals from counter 39 are applied to input terminals 13 and 6, respectively of the phase detectors as well as an inverted polarity 800 Hz signal applied through an inverter circuit 51 to terminals 5 and 12, respectively of the phase detectors 50 and 52.

The input signals applied to phase detectors 50 and 52, however, are first filtered by bandpass filters 40 and 42 to substantially eliminate (40 db suppression) all but the second order harmonic frequencies. This is achieved by applying the signals from coils 21 and 23 to the signal input terminals 5 and 16 of bandpass filters 40 and 42, respectively. Circuits 40 and 42 are each ½ of a commercially available National Semiconductor integrated circuit chip, model number MF-10, which is a switched capacitor sampled data filter driven by the 80 kHz clock oscillator 25 and having the RC components shown coupled to provide an amplifier gain of approximately 1000 and having a Q of 50 to substantially eliminate all but the second harmonic frequency information coupled by capacitors 43 and 44 to the input terminals of phase detectors 50 and 52. The phase detectors are synchronized in phase with this second harmonic information by the 800 Hz signal applied to their clock input terminals from counter 39 and inverter 51 such that signals are applied to output terminals 2 and 3 of detector 50 and 9 and 10 of detector 52 only during a precise and predetermined phase relationship to the fundamental driving frequency of 400 Hz applied to driver amplifier 32. In practice, the 800 Hz signals applied to synchronize phase detectors 50 and 52 are off-set approximately 90° from the fundamental driving frequency such that the transition from logic zero to logic one and back occur during the enable portion of the signals applied to detectors 50 and 52 at the second harmonic frequency. Since the phase detectors as well as the driver amplifier are locked to the clock oscillator 25 through the counter circuits, this precise and predetermined phase relationship can be selected and maintained to provide a maximum amplitude output signal from the phase detectors for a given output signal from sensing coils 21 and 23 without the necessity of tuning. The inverted output signals on pins 2, 3 and 9, 10, respectively, of detectors 50 and 52 are applied to opposite polarity inputs of operational amplifier 64 and 62 which serve as integrating circuits in conjunction with the feedback and integrating capacitors and resistors coupled as shown in FIG. 3 to provide DC output signals $e_1$ and $e_2$ at output terminals 65 and 66. Signals $e_1$ and $e_2$ indicate the direction of orientation of the flux-gate sensor with respect to earth's magnetic field and, therefore, that of the vehicle in which the sensor is mounted. By providing signals $e_1$ and $e_2$, corresponding to the orthogonal coordinates of direction and each of which can have a positive or negative polarity relative to floating ground, all the information necessary for the vehicle heading is available in these two signals. As noted above, these analog signals are converted into a digital format and applied to a microprocessor for providing digital information to a display 100, as shown in FIG. 2.

With the system of the present invention, therefore, signal information from coils 21 and 23 are filtered and detected in synchronism with the drive frequency applied to excitation coil 13, therefore providing precise, predetermined orthogonally related signal information pertaining to the direction of orientation of the flux-gate sensor with respect to a magnetic field without the necessity of precisely tuning bandpass filters. The utilization of such a system also eliminates the need for providing a crystal control or extremely stable oscillator since the oscillator frequency is not critical. Various modifications to the preferred embodiment of the present invention can be made. Thus, for example, the display 100 may be digital, as shown, or an analog type. If desired, the microprocessor can provide information other than the alpha information corresponding to the octant headings (N, NE, E, SE, S, SW, W, NW) and, for example, can display degree heading or other magnetic field information. The location of the sensor 10, although preferably shown in the barrel 20 of the rearview mirror mounting assembly, can be positioned at other locations although preferably in the headliner area remote from the dashboard of the vehicle.

These and other modifications to the preferred embodiment of the present invention will become apparent to those skilled in the art and fall within the spirit and scope of the present invention as defined by the appended claims.

The embodiments of the invention in which an exclusive property or privilege is claimed are defined as follows:

1. A control circuit for use with an electrically operated magnetic field detector employing a flux-gate sensor comprising:
   an oscillator for providing clock frequency output signals;
   counter means coupled to said oscillator and responsive to said clock frequency signals therefrom for providing an excitation frequency signal for a flux-gate sensor and for providing a synchronization signal at a harmonic frequency of said excitation frequency;
   bandpass filter means coupled to said oscillator and including means for receiving signal information from a flux-gate sensor and responsive to signal information and signals from said oscillator to provide signals at said harmonic frequency of said excitation frequency; and
   detection means coupled to said filter means and to said counter means and responsive to the synchronization signal and signals from said filter means for providing output signals representative of the orientation of a flux-gate sensor to an external magnetic field.

2. The circuit as defined in claim 1 wherein said bandpass filter means is a digital sampled data filter.

3. The circuit as defined in claim 2 wherein said harmonic frequency is the second harmonic.

4. The circuit as defined in claim 3 wherein said detection means includes digital phase detection means having a signal input coupled to the output of said bandpass filter and having clock input means coupled to said counter means for synchronizing the detection of signal information with said excitation frequency signal.

5. The circuit as defined in claim 4 wherein said detection means further includes integrating means having input means coupled to said phase detection means for providing an analog output signal therefrom.

6. The system as defined in claim 5 and further including circuit means coupled to said integrating means for providing a display of the orientation of a flux-gate sensor.

7. A vehicle compass system comprising:
   a flux-gate magnetic sensor having excitation input and signal output terminals;
   an oscillator for providing clock frequency output signals;
   counter means coupled to said oscillator and responsive to said clock frequency signals therefrom for providing an excitation frequency signal applied to said excitation input of said flux-gate sensor and for providing a synchronization signal at a harmonic frequency of said excitation frequency;
   bandpass filter means coupled to said oscillator and to said signal output terminals of said flux-gate sensor and responsive to signal information from said flux-gate sensor and signals from said oscillator to pass signals therethrough at said harmonic frequency of said excitation frequency;
   detection means coupled to said filter means and to said counter means and responsive to the synchronization signal and signals from said filter means for providing output signals representative of the orientation of a vehicle in which said flux-gate sensor is installed; and
   display means coupled to said detection means and responsive to said output signals for displaying the orientation information.

8. The circuit as defined in claim 7 wherein said harmonic frequency is the second harmonic.

9. The circuit as defined in claim 8 wherein said bandpass filter means is a digital sampled data filter.

10. The circuit as defined in claim 9 wherein said detection means includes digital phase detection means having a signal input coupled to the output of said bandpass filter and having clock input means coupled to said counter means for synchronizing the detection of signal information with said excitation frequency signal.

11. The circuit as defined in claim 10 wherein said detection means further includes integrating means having input means coupled to said phase detection means for providing an analog output signal therefrom.

12. A control circuit for use with an electrically operated vehicle compass employing a flux-gate sensor comprising:
- an oscillator for providing clock frequency output signals;
- counter means coupled to said oscillator and responsive to said clock frequency signals therefrom for providing an excitation frequency signal for a flux-gate sensor and for providing a synchronization signal at a harmonic frequency of said excitation frequency;
- digital sampled data bandpass filter means coupled to said oscillator and including means for receiving signal information from each signal output of a flux-gate sensor and responsive to signal information and signals from said oscillator to pass therethrough signals at substantially only said harmonic frequency of said excitation frequency; and
- digital phase detection means coupled to said filter means and to said counter means and responsive to the synchronization signal and signals from said filter means for providing output signals representative of the orientation of a flux-gate sensor.

13. The circuit as defined in claim 12 wherein said harmonic frequency is the second harmonic.

14. The circuit as defined in claim 13 and further including integrating means having input means coupled to said digital phase detection means for providing an analog output signal therefrom.

15. The system as defined in claim 14 and further including circuit means coupled to said integrating means for providing a display of the orientation of a flux-gate sensor.

16. The system as defined in claim 15 wherein said excitation frequency is about 400 Hz.

* * * * *

UNITED STATES PATENT AND TRADEMARK OFFICE
CERTIFICATE OF CORRECTION

PATENT NO. : 4,424,631

DATED : January 10, 1984

INVENTOR(S) : Jeffrey L. Franks

It is certified that error appears in the above-identified patent and that said Letters Patent is hereby corrected as shown below:

Column 1, lines 4-7:

"BACKGROUND OF THE INVENTION P The present invention relates to compasses and, particularly, to an electrical circuit for processing signals from a flux-gate magnetic sensor used in a compass."

should be:

--BACKGROUND OF THE INVENTION

The present invention relates to compasses and, particularly to an electrical circuit for processing signals from a flux-gate magnetic sensor used in a compass.--

Signed and Sealed this

Seventeenth Day of July 1984

[SEAL]

Attest:

GERALD J. MOSSINGHOFF

Attesting Officer

Commissioner of Patents and Trademarks